May 6, 1969
L. C. H. JUY
3,442,148
CHANGE SPEED CONTROL DEVICE
Filed May 15, 1967
Sheet 1 of 3
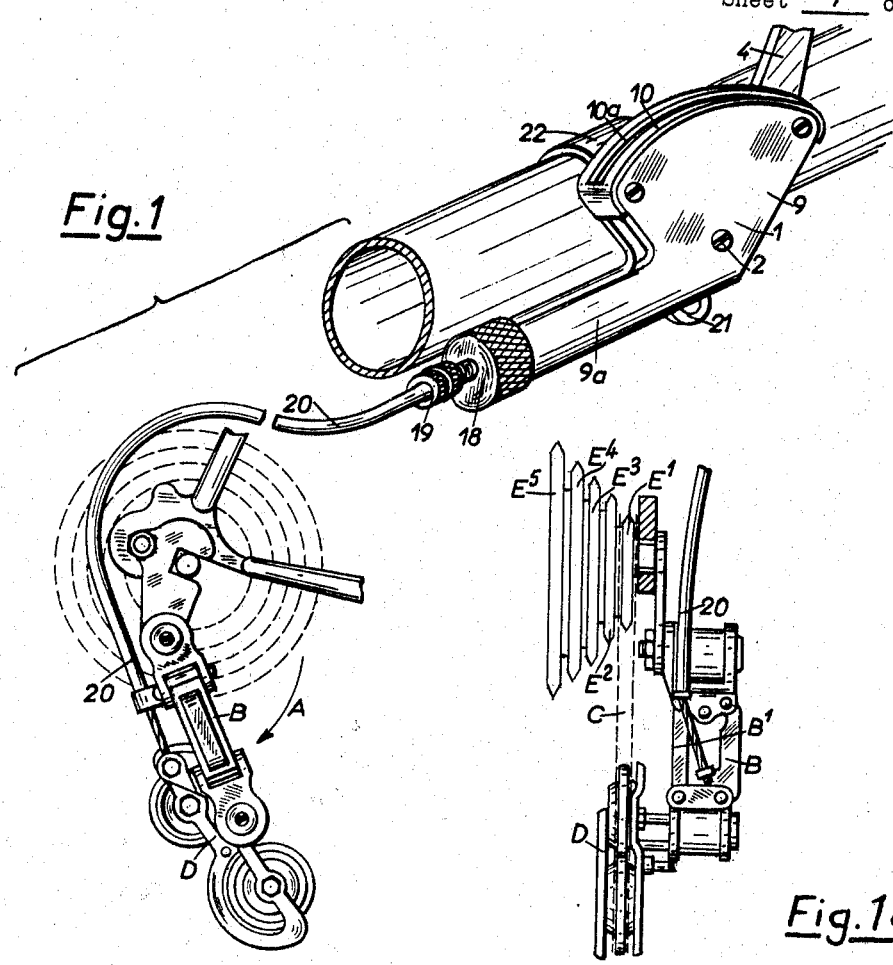
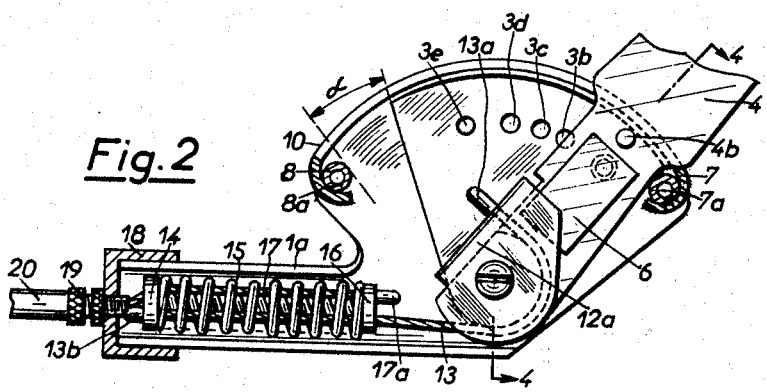

May 6, 1969  L. C. H. JUY  3,442,148
CHANGE SPEED CONTROL DEVICE
Filed May 15, 1967  Sheet 3 of 3

3,442,148
CHANGE SPEED CONTROL DEVICE
Lucien Charles Hippolyte Juy, 75 Rue General-Fauconnet, Dijon, Cote-d'Or, France
Filed May 15, 1967, Ser. No. 638,205
Claims priority, application France, Dec. 23, 1966, 9,617
Int. Cl. G05g 1/10, 11/00, 5/06
U.S. Cl. 74—470                 10 Claims

ABSTRACT OF THE DISCLOSURE

Change speed control device for a derailleur gear system, wherein a chain displacing cable control lever and a plate are mounted for pivotal movement through an arc delimited by stops, said control lever and plate being independently movable to permit the system to be tensioned and detensioned respectively before and after a gear change effected by chain displacement against spring influence, there being a spring-loaded ball carried by the lever and corresponding apertures in the plate to locate said lever in any one of a number of gear selecting positions in which the ball is received in a corresponding aperture

---

The present invention relates to derailleur gear systems and is concerned with change speed gear control devices for controlling chain displacement in such systems.

According to the present invention there is provided a change speed gear control device for controlling chain displacement in a derailleur gear system by means of a cable, said device including a support plate, a pivot on said support plate, a further plate and a cable control lever mounted on said pivot for independent angular movement, two stops delimiting an arc of movement for said lever and movable plate across the surface of said support plate, the relative dimensions of the movable plate and lever being such that a greater degree of movement is afforded to the lever than to the movable plate, and co-operating means on the lever and the movable plate for locating said lever in any one of a number of defined angular gear selecting positions relative to the movable plate.

In derailleur gear systems where transfer of the driving chain from one driving sprocket to another is effected by displacement of a spring influenced chain guide, it is necessary initially to tension the system prior to transfer of said chain in the direction against the influence of said spring. With the arrangement of the invention, the system may be tensioned by drawing in a predetermined amount of the control cable. This amount of cable is drawn in by pivotal movement of the lever and the movable plate which is entrained thereby from a position in which said movable plate abuts a first of said stops to the position in which said plate abuts the second of said stops and is arrested thereby. At this point the system is tensioned and continued movement of said lever independently of the arrested movable plate towards the second stop draws in a sufficient additional length of the cable to effect the desired chain transfer. Having effected this desired chain transfer, the system may then be detensioned by releasing the lever whereupon said lever and the movable plate entrained thereby are returned by said spring influence to the detensioned position in which said plate abuts the first stop. In order to transfer the driving chain in the opposite direction it is unnecessary initially to tension the system.

Figure 3:
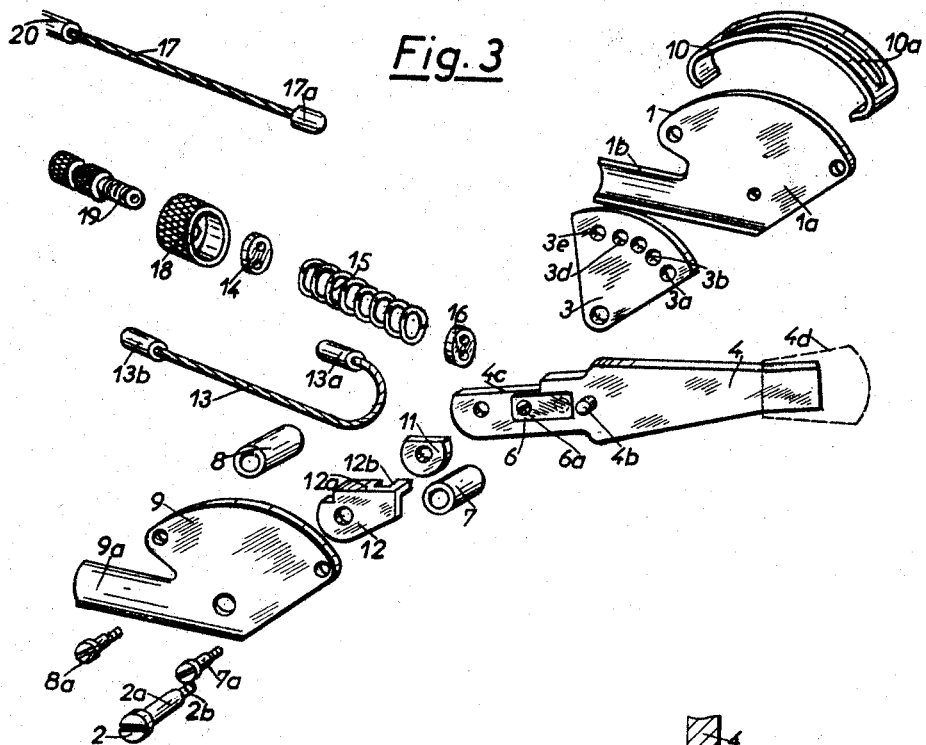
Figure 4:
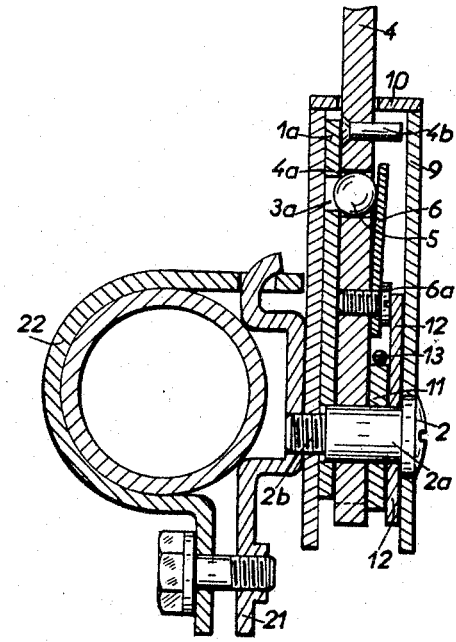

In order that the present invention may be more clearly understood and readily carried into effect, the same will now be described with reference to the accompanying drawing, in which:

FIGURE 1 shows in perspective one embodiment of the invention and a change speed gear mechanism controlled thereby, FIGURE 1a is an end view of the change speed gear mechanism, FIGURE 2 shows, on a larger scale, a sectioned side elevation of the embodiment of FIGURE 1, FIGURE 3 shows an exploded view of this embodiment, FIGURE 4 shows, on a larger scale, a section along the line 4—4 of FIGURE 2, and FIGURES 5, 6 and 7 are sectioned side elevations of the embodiment shown in FIGURES 1 to 4 illustrating successive phases in the functioning thereof.

Referring now to the drawing, a change speed gear control device includes a rear support plate 1 which is cut to shape and stamped so as to constitute a sector 1a and and integral tubular half-shell 1b.

Mounted between the support plate 1 and a front plate 9 for free pivoting on the shouldered bearing face 2a of a pivot 2 screwed at one end 2b in the plate 1 are on the one hand a movable plate 3 of sector shape, adjacent the support 1 and, on the other hand, a lever 4 adjacent the plate 3.

The lever 4 is formed with an aperture 4a dimensioned to receive a ball 5 adapted to be partially and successively engaged in positioning apertures 3a, 3b, 3c, 3d, 3e formed in the plate 3. The positioning apertures 3a–3e are formed on a common circular arc the radius of which corresponds to the distance between the center of the aperture 4a and the pivoting axis of the lever 4. It is possible to form, instead of apertures, recesses or other positioning arrangements.

The ball 5 is engaged in the aperture 4a and subjected to a resilient thrust force, in a constant direction towards the plate 3, by means of a leaf spring 6 secured by a screw 6a on the lever 4.

Stops 7 and 8 are located at each end of the arc of the sector 1a to limit the angular displacements of the lever 4 and the plate 3. These stops 7, 8 are secured to the ends of the support plate 1 and in the embodiment shown consist of tubular cross-members or spacers through which screws 7a–8a extend to secure the front plate 9 in position. With said plate 9 secured in position, as aforesaid, the component parts of the device are concealed and protected. Furthermore, the stops 7–8 are utilized for retaining a slotted transverse strip 10 providing a packing or binding between the plates, at the upper portion thereof. This strip is formed with a slot 10a for the passage and free sliding of the lever 4. Markings or other indications corresponding to the speeds may be provided on the visible external surface of the strip 10.

The lever 4 is provided with a laterally projecting stud 4b which, during displacement of said lever, co-operates with the front plate 9 to retain said lever in position.

A support washer 11 is mounted around the pivot 2 and is located on the side of the lever 4 remote from the support plate 1 and a cable retaining member 12 is similarly mounted around the pivot 2 and is located between said support washer 11 and the front plate 9. This member 12 is provided with a turned-over lug 12a formed with a slot 12b in which a traction cable 13 is engaged. This cable 13 terminates in an arresting head 13a which bears against the lug 12a. The cable bears on the periphery of the washer 11 the thickness of which is sufficient to permit the free sliding of said cable.

In the assembled position, the turned-over lug 12a bears against a co-operating recessed portion 4c of the lever 4.

The front plate 9, which together with the support plate 1 and the strip 10 forms a housing, is removable to reveal the interior of said housing and, to this end, said plate 9 may be withdrawn without dismantling the assembly. For this purpose the diameter of the lower aperture in the plate 9 permits the free passage of the head of the pivot 2.

The other end of the traction cable 13 has a similar arresting head 13b and carries a traction member 14 provided with a centering shoulder for the end of a high-tension spring 15. The other end of the said spring is centered and bears against a member 16 through which the cable 13 extends freely.

As shown in FIGURE 2, a control cable 17, which extends from the control device to the change-speed gear, passes freely through the member 14 and is provided with an arresting head 17a which bears against the member 16.

The front plate 9 has a tubular half-shell 9a corresponding to the half-shell 1b of the plate 1 and, in the assembled position, the spring 15 and the members 14 and 16 together with the corresponding cable parts are located in the passage defined by the co-operating half-shells 9a–1b. A cap 18 blocks the end of the passage defined by the half-shells 9a–1b and an adjustable stop 19 is screwed into cap 18 to serve as an arresting means for a sheath 20 of the cable 17.

The assembled device may be fitted and secured in any appropriate manner on the part of the vehicle on which it is to be mounted, for example on a tubular frame of a bicycle, with the aid of a mounting lug 21, which is rigid with the plate 1, and a corresponding half-collar 22, as illustrated in FIGURE 4.

The lever 4 is suitably dimensioned and has a length providing sufficient amplitude for the control displacements. The end of the lever may carry a ball or a fitted head 4d to facilitate manual grasping.

Furthermore, FIGURE 1 shows, purely by way of example, the change-speed gear mechanism which is controlled by the device of the invention. This change-speed gear mechanism is generally designated by the reference A and comprises an articulated parallelogram, the arms B–B¹ of which are pivoted by the action of the control cable 17. The illustration shows the roller-carrier D integral with the parallelogram and transversely entraining the chain C for movement selectively to engage one of the sprockets E1, E2, E3, E4, E5 of the free wheel. There could equally well be less than five sprockets. A recall spring (not shown) operates in any known manner recalling the roller-carrier and the chain to the sprocket of smaller diameter E1.

It should be emphasized that the gaps between the apertures 3a, 3b, 3c etc. and the gaps in respect of the end apertures relative to the end of the sector-shaped plate 3, and also the angular gap α between the end of the plate 3 and the stop 7 are suitably determined so as to achieve a satisfactory speed change and also compensation for the tension and detension in the control transmission system, under the conditions discussed hereinbelow.

The operation of the device of the invention will now be described.

Referring to FIGURE 2, the lever 4 is in the starting position corresponding to the engagement of the chain C on the sprocket E1. The ball 5 is partially engaged in the aperture 3a and the lever 4 and the sector-plate 3 abut the stop 7.

Figure 5:
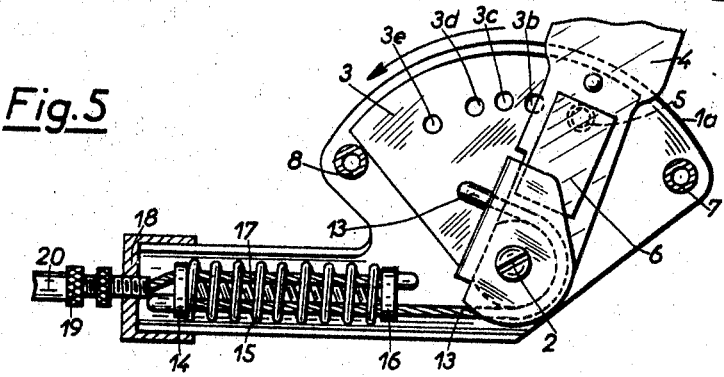

When it is desired to change the speed and to engage the chain for example on the sprocket E2, the lever 4 is pivoted in the direction indicated by the arrow (FIGURE 5). At the same time, the sector-plate 3 is entrained by the ball 5 and is pivoted through the angle α to abut the stop 8. During this angular travel the transmission system is tensioned and the roller-carrier recall spring is compressed and stressed.

Continuing the pivoting of the lever 4 (FIGURE 6), with the sector-plate 3 abutting against the stop 8, the ball 5 passes out of the first positioning aperture 3a, against the action of the thrust of the leaf spring 6. After an angular travel corresponding to the gap between the apertures 3a and 3b, the ball 5 is partly engaged in the aperture 3b. The user has no difficulty in perceiving this engagement and the change-over to the following speed by the engagement of the chain on the sprocket E2. The angular travel of the lever 4 between the apertures 3a and 3b corresponds to an effective pull on the cable 17 producing the displacement of the chain from the sprocket E1 as far as the sprocket E2.

Figure 6:
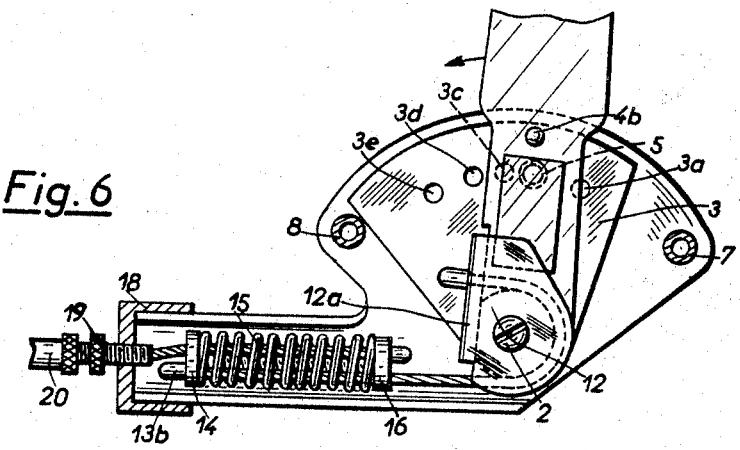
Figure 7:
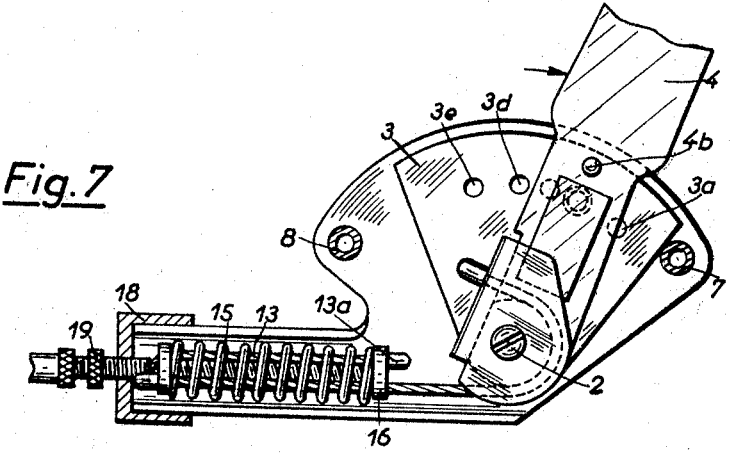

This travel and this displacement have an amplitude which is sufficient to ensure free and clear passage of the chain to the sprocket corresponding to the speed selected. However, if this position were to be maintained as illustrated in FIGURE 6, the chain C might rub against the following sprocket E3. This does not take place since, as soon as the speed has been changed and the lever 4 has been released, a recall movement is produced jointly due to the action of the recall spring of the change speed gear mechanism A and the resilient recall effect caused by the natural resilience of the tensioned cable 17. The assembly comprising the lever 4 and the sector plate 3 is recalled until the end of the sector encounters the stop 7 (FIGURE 7). This recall is thus effected in respect to the value of the angle α which is both the previous tensioning angle and the detensioning angle corresponding to satisfactory alignment of the chain on the engaged sprocket. In this manner the transmission system is detensioned and the stress on the recall spring is reduced.

The same applies to the displacement of the chain C onto the other sprockets, as far as the sprocket E5.

It should be emphasized that the device and its means for tensioning and detensioning the transmission system during transfer of the chain from the sprocket E1 towards the sprocket E5 is particularly effective for changing the speeds one by one in a precise manner in the opposite direction, i.e. starting with the large sprocket E5 and ending with the small sprocket E1. In this case, however, transfer of the chain is effected simply by pivoting the lever 4 in a clockwise direction so as to displace the ball 5 sequentially from the positioning aperture 3e towards the positioning aperture 3a. Further manipulation of the control device is unnecessary since the transmission system has already been detensioned by the return of the plate 3 to abut the stop 7 following previous transfer of the chain from one sprocket to another in the direction from the sprocket E1 towards the sprocket E5.

In fact, if the device were to include a fixed sector-plate having speed-positioning apertures, in place of the movable sector-plate 3, the cancellation of the tension of the transmission system would not be effected and the passage of the chain from the sprocket E5 to the sprocket E4 would require an angular displacement of the lever which is substantially double that necessary in respect of the passage between sprockets E4 and E5. Due to this fact, the lever positioning ball would not be in the aperture corresponding to the desired sprocket but would take up a position in the following aperture, the result of which would be constant and inevitable displacement resulting in the direct passage of the chain from the sprocket E3 to the sprocket E1 without any possibility for positioning on the sprocket E2.

The spring 15 constitutes a transmission damping means when the chain passes from one sprocket to the other without pedalling and thus without driving said chain. This spring permits a complete angular displacement of the lever 4 corresponding to the passage of the chain C from the sprocket E1 to the sprocket E5 and vice versa, this being done without pedalling and without damage to the transmission. In this case, the cable 13 is wound on the washer 11 and compresses the spring 15 which is subjected to the essential part of the traction force. The control cable 17 is subjected only to limited traction by means of the transverse contact of the chain between the sprockets and the roller-carrier D. There is no excessive and dangerous stressing of the transmission system, the chain or the change-speed gear.

As soon as pedalling is commenced and the chain C is driven, the spring 15 is detensioned and the cable 17 is subjected to a progressive resilient traction force actuating the change-speed gear in a manner corresponding to the position of the lever 4.

The importance and the advantages of the device are clear: in particular there is rational and progressive control of speed changing with satisfactory alignment of the chain for each speed: precise and constant positioning of the speeds which the user finds readily in every case: a possibility for pivoting (without pedalling) the lever, either between any two adjacent positioning apertures 3a–3e whereby speed by speed change may be effected over the entire angular displacement corresponding to all the speeds, reliably and without damage.

I claim:

1. A change speed gear control device for controlling chain displacement in a derailleur gear system by means of a chain displacement control cable, said device including a support plate, a pivot on said support plate, a movable plate and a cable control lever mounted on said pivot for independent angular movement, means for connecting said control lever with the chain displacement control cable to operate the gear system in accordance with operation of the control lever, two stops delimiting an arc of movement for said lever and movable plate across the surface of said support plate, the relative dimensions of the movable plate and lever being such that a greater degree of movement is afforded to the lever than to the movable plate, and co-operating means on the lever and the movable plate for locating said lever in any one of a number of defined angular gear selecting positions relative to the movable plate.

2. A change speed gear control device as claimed in claim 1, wherein said co-operating means includes a plurality of arcuately spaced apertures in said movable plate and a spring influenced projection carried by the control lever, said apertures being arranged to receive said projection and locate said lever in predetermined gear selecting positions.

3. A change speed gear control device as claimed in claim 2, wherein the control lever has an aperture, said projection comprising a ball located in said aperture, said co-operating means further comprising spring means to urge said ball selectively into the apertures in said movable plate to locate the control lever in defined gear selecting positions.

4. A change speed gear control device as claimed in claim 3, wherein said means connecting the control lever with said cable comprises a short traction cable operatively connected to the control lever and coupled to said chain displacement control cable.

5. A change speed gear control device as claimed in claim 4, comprising a washer and a cable retaining member mounted on the pivot on which the movable plate and control lever are pivotably mounted, said traction cable being wound part way around the washer periphery and being connected at one end for movement with said lever by said cable retaining member.

6. A change speed gear control device as claimed in claim 5, comprising an out-turned lug on the cable retaining member which overlies an edge of the control lever, said lug being shaped to define a recess receiving and retaining the traction cable for movement with said lever.

7. A change speed gear control device as claimed in claim 4 wherein said means connecting the control lever with said cable comprises a compensating spring interposed between the traction cable and said control cable so that said traction cable and said control cable are coupled through the intermediary of said spring.

8. A change speed gear control device as claimed in claim 7, comprising a co-operating plate mounted on the support plate to define a housing and integral tubular half shells on said support plate and co-operating plate to form, in the assembled condition, a tubular extension to the housing accommodating the compensating spring.

9. A change speed gear control device as claimed in claim 8, comprising a strip interconnecting the support plate and co-operating plate of the housing, said strip having a longitudinal slot therein for receiving and guiding the control lever during pivotal movement thereof.

10. A change speed gear control device as claimed in claim 9, wherein reference markings are provided along the slot edge to indicate the lever position corresponding to the selection of each gear.

References Cited

UNITED STATES PATENTS 2,785,586    3/1957    Schwerdhofer _____ 74—489

MILTON KAUFMAN, *Primary Examiner.*

U.S. Cl. X.R.

74—489, 533